F. COWIE.
SHOCK ABSORBER.
APPLICATION FILED SEPT. 20, 1915.
1,193,241.
Patented Aug. 1, 1916.
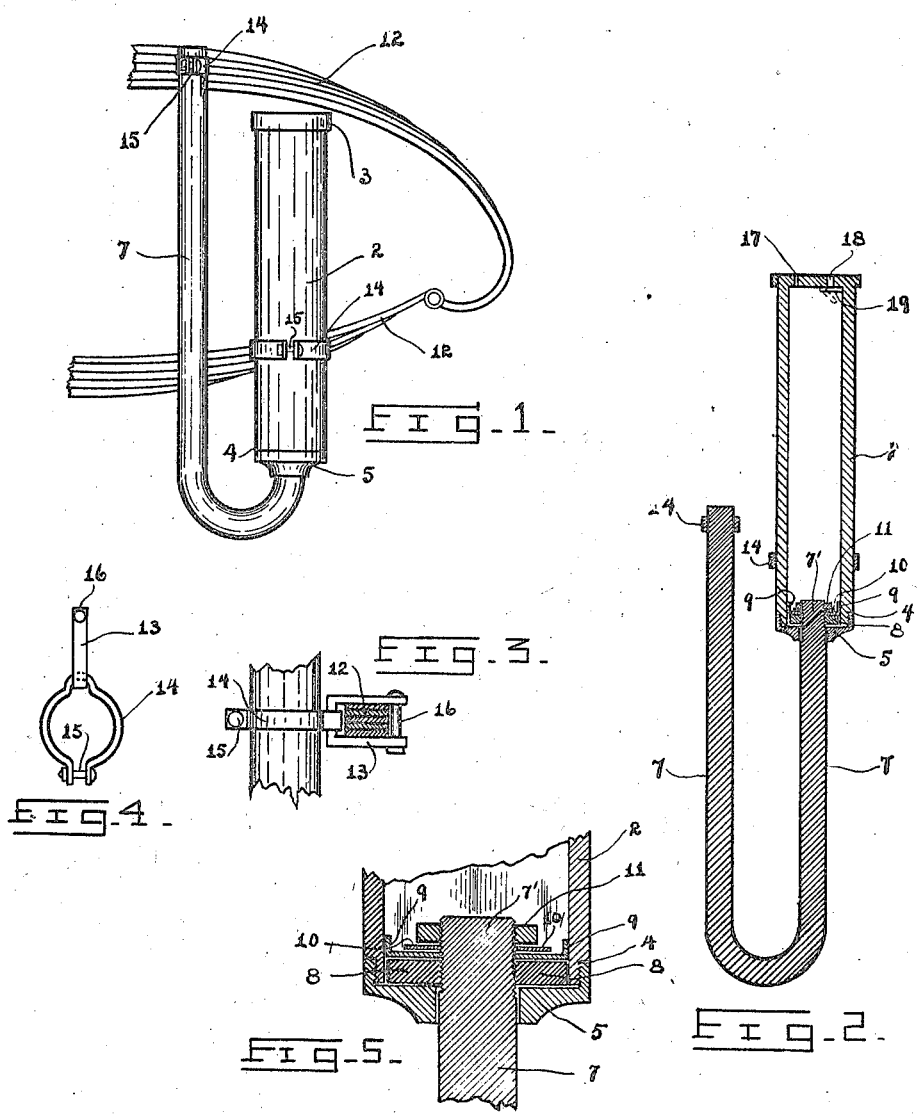

UNITED STATES PATENT OFFICE.

FREDERICK COWIE, OF ATHA, ONTARIO, CANADA.

SHOCK-ABSORBER.

1,193,241.

Specification of Letters Patent.

Patented Aug. 1, 1916.

Application filed September 20, 1915. Serial No. 51,718.

*To all whom it may concern:*

Be it known that I, FREDERICK COWIE, a citizen of the Dominion of Canada, residing at Atha, in the county of Ontario, Province of Ontario, Canada, have invented certain new and useful Improvements in Shock-Absorbers, of which the following is a specification.

This invention relates to shock absorbers for vehicles, but is more particularly designed for use in connection with automobile springs. It is well known that a great number of automobile springs are broken by the sudden shock when going over a street crossing or rough piece of road. It is not the downward tension on the spring which causes the breakage, it is the sudden upward jolt. This not only breaks the springs but makes it very uncomfortable for riding in the automobiles.

I have a very simple device, which will greatly overcome this sudden upward jolt, when attached between the upper and lower parts of the spring. A cylinder of a nature hereinafter more fully described is attached to the lower part of the spring and a plunger, which is designed to operate in the said cylinder, is attached to the upper part of the spring. When sudden tension is put on the spring, the plunger is pulled out of the cylinder and air fills the same through an automatic shut-off valve at the top of the cylinder. But on the reaction of the spring, the plunger is allowed to go back into the cylinder at a regulated speed as the cylinder is full of air and the automatic shut-off valve stops the escape by that opening. A smaller opening is made in the top of the cylinder for this purpose and the size of this will regulate the speed of the reaction of the spring when put under sudden tension.

It will thus be seen, that the main object of my invention is to provide means by which to regulate the reaction of springs put under tension.

A further object of my invention is to provide a shock-absorber to be used in connection with automobile or other springs and a means of fastening the same to the springs.

With these and other objects in view, my invention consists of the novel combination of parts hereinafter described and defined in the claims.

In the accompanying drawings, which illustrate my invention, like characters indicate like parts throughout the several views.

Referring to the drawings, Figure 1 is a side elevation, showing the shock-absorber as attached to the ordinary style of springs used on automobiles. Fig. 2 shows a sectional view of the same. Fig. 3 shows side elevation view of the attachment means. Fig. 4 shows a top elevation view of the attachment means. Fig. 5 shows an enlarged sectional view of the end of the plunger.

The numeral 2 indicates the cylinder part of my invention. This cylinder has its upper end provided with a cap 3 which is securely fastened to the cylinder. This can either be made in one solid piece in the making of the cylinder or can be made separately and soldered or welded on, but it must be securely fastened, as there will be a great tension of air pressure exerted on it. The lower end 4 is threaded on its outer surface and adapted to have the cap 5 screw thereon. This cap 5 has an opening 6 through which the plunger 7 passes. This plunger 7 is formed of a solid rod bent U-shaped. One of its ends 7' is threaded to receive the round nut 8. This round nut 8 is the full size of the bore of cylinder 2 but not tight. Over the round nut 8 is placed a leather washer 9. This leather washer 9 is slightly larger than the bore of the cylinder 2 and thus its outer edge turns up as better shown in the sectional view Fig. 5. This leather washer 9 is kept rather soft, by the application of oil. The reason for having it soft will be mentioned later on in this specification. Over the leather washer 9 is a metal washer 10 to hold leather washer 9 in place when tightened down by the nut 11. The other end of the U-shaped plunger 7 is fastened to the upper portion of the spring 12 by means of the bracket 13 which is connected to the upper part of the spring 12 by the bolt 16. A band 14 is connected to the bracket 13 and is secured around one end of the plunger 7 by the bolt 15 to tighten the band securely to said end of the plunger. The cylinder 2 is connected to the lower spring by a like arrangement which does not need to be specifically described.

Referring to Fig. 2, in the cap 3 of the cylinder 2, an opening 17 is made. This opening should not be of a very large size, the reason for which will be explained further on in this specification. Another opening 18 is made in the cap 3. This opening 18 is provided with a one-way valve or suction-flap 19.

Referring to Fig. 1, I have shown my invention as attached to a set of springs 12, showing the springs 12 in their normal positions. When tension is exerted to compress the springs 12, the cylinder 2 is held in the same position but the plunger 7 is pulled down. In the pulling down the end 7' with its attached parts 9, 10 and 11, air is allowed to come in through the opening 18 into the cylinder 2. Now on the re-action when the spring starts to return to its normal position, the end 7' of the plunger 7 is pushed up in the cylinder 2, the one way valve or suction trap 19 closed by the pressure of the air and all the air in the cylinder 2 has to be forced through the opening 17. This opening 17 is small and will allow the air to escape only at a steady rate. This will make the re-action at a steady upward movement and not with a sudden jerk. The leather washer 9 will fit tightly against the inner side of the cylinder 2 and when it is oiled, the end 7' with its various attached parts will make an air-tight piston working in its cylinder 2. When it is desirous of putting more oil into the cylinder 2, this can be put in through either openings 17 or 18, without having to open any of the parts of the device.

It will thus be seen that I have provided a simple and effective shock-absorber, one which can be manufactured cheaply and quickly attached to springs on which it is to be used.

While I have herein shown and described one particular embodiment of my invention, I wish it to be understood that I do not confine myself to all the precise details of construction herein set forth by way of illustration, as modifications and variations may be made without departing from the spirit of the invention or exceeding the scope of the appended claims.

What I claim as new is:—

1. A shock-absorber, comprising a cylinder and a U-shaped plunger, said cylinder having a cap securely attached to one end, said cap having two openings, one of said openings being provided with a one-way valve, the other end of said cylinder being threaded on its outside and being adapted to have a cap screwed thereon, said cap having an opening through which one end of the said U-shaped plunger works, said end of plunger being threaded and adapted to have a round nut screwed thereon, a leather washer on said nut, said leather washer having its outer edge turned up, a washer and a nut holding the leather washer on said round nut, the other end of said plunger being attached to upper section of any spring, said cylinder being secured to the lower section of said spring.

2. A shock-absorber, comprising a cylinder and a U-shaped plunger, said plunger having one end working in said cylinder, said end of plunger being threaded and adapted to receive a round nut, a leather washer, a metal washer and a nut, all securely tightened together, said leather washer having its edge turned up, said plunger having its other end attached to the upper section of any spring, said cylinder being attached to the lower section of said spring, said cylinder being provided at its upper end with a cap, said cap having holes therein, one of said holes having a one-way valve therein.

3. In combination with a spring including upper and lower members, a cylinder secured to the lower member, a U-shaped plunger having one end attached to the upper member, a piston attached to the other end of the plunger and operating in said cylinder, said cylinder provided with two apertures, a check valve closing one of the apertures, whereby upon movement of the spring members toward each other air will be drawn into the cylinder through the check valve, and upon movement of the spring members away from each other the air will be forced from the cylinder through the unobstructed aperture.

In testimony whereof I affix my signature in the presence of two witnesses.

FREDERICK COWIE.

Witnesses:
RUSSELL COWIE,
META COWIE.